Sept. 12, 1939.　　　　S. A. SNELL　　　　2,172,811
AUTOMOBILE RUNNING GEAR
Filed May 2, 1938　　　2 Sheets-Sheet 1
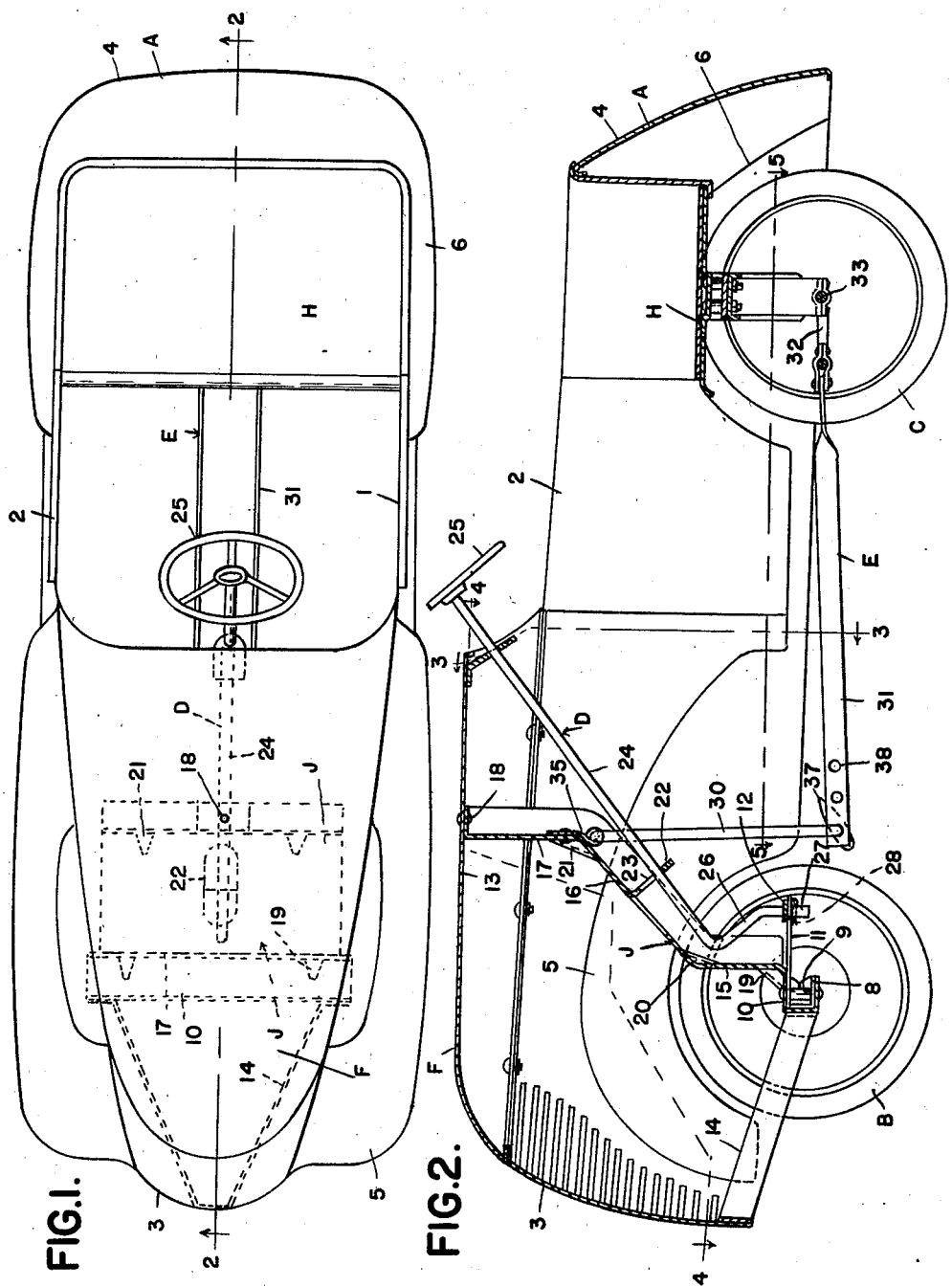
INVENTOR
SAMUEL A. SNELL
BY
ATTORNEYS Sept. 12, 1939.     S. A. SNELL     2,172,811
AUTOMOBILE RUNNING GEAR
Filed May 2, 1938     2 Sheets-Sheet 2
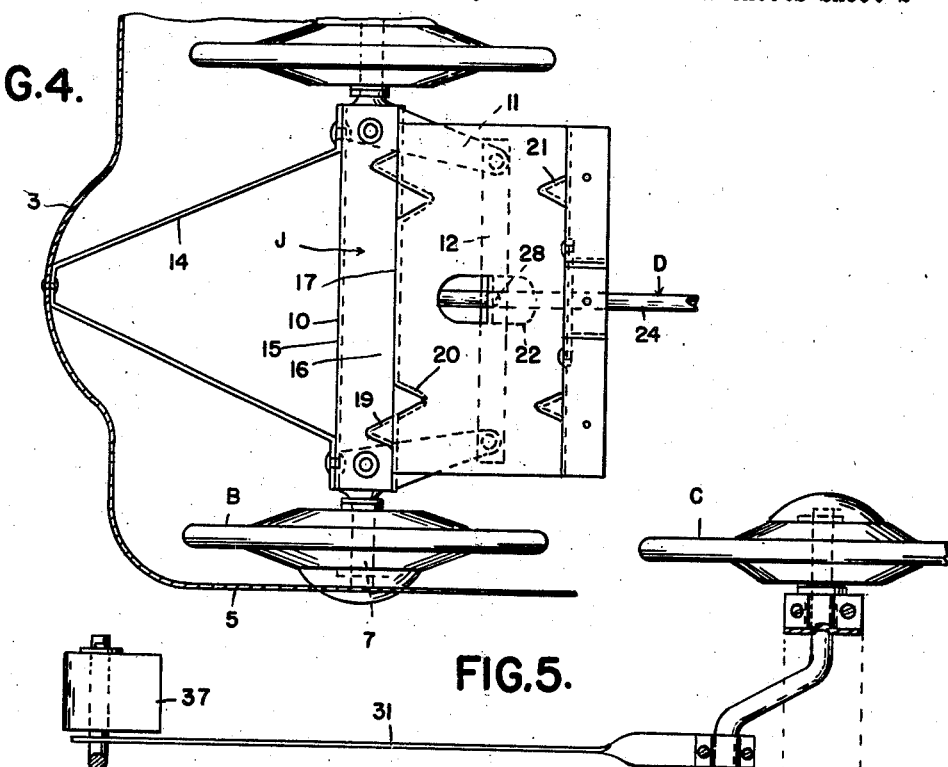
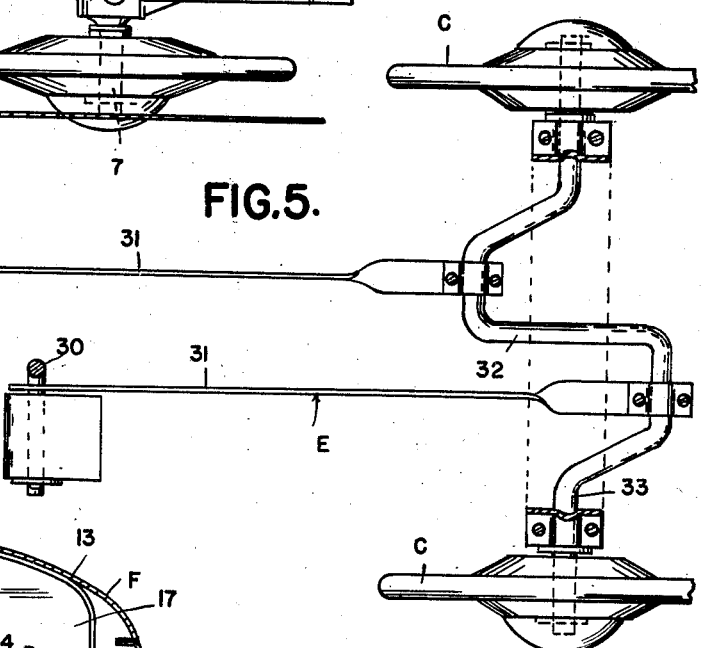
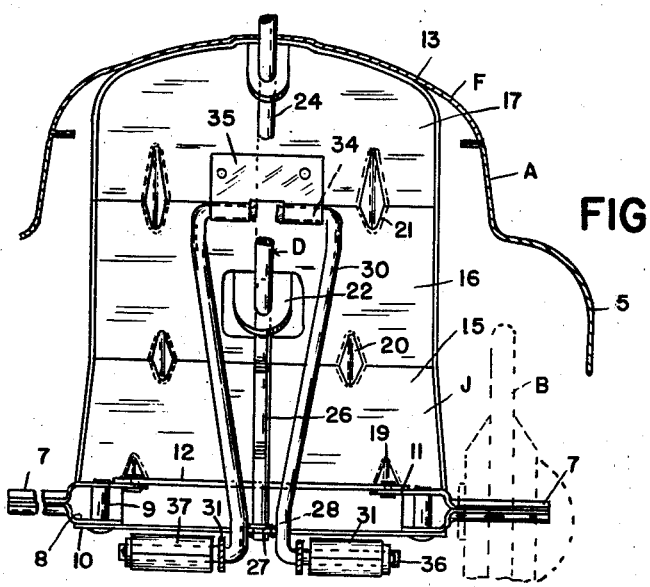
INVENTOR
SAMUEL A. SNELL
BY
ATTORNEYS Patented Sept. 12, 1939

2,172,811

UNITED STATES PATENT OFFICE 2,172,811

AUTOMOBILE RUNNING GEAR

Samuel A. Snell, Toledo, Ohio, assignor to The American-National Company, Toledo, Ohio, a corporation of Ohio Application May 2, 1938, Serial No. 205,622

14 Claims. (Cl. 280—269)

This invention relates generally to juvenile vehicles such as automobiles of the type in which a child rides and refers more particularly to the running gear thereof.

Heretofore it has been customary to provide such vehicles with pressed metal bodies and to provide within such bodies at the forward ends thereof a common support for the front wheels and steering mechanism. In the past this support has been in the form of an upright plate that extended between and was secured to opposite sides or outwardly bulging fender portions of the body. However, in practice it was found that notwithstanding the bodies were formed by dies, the distance between opposite sides or between the outwardly bulging fender portions thereof varied. For example, the bodies were either too wide or too narrow for the supporting plates. As a result, considerable difficulty was experienced when the supporting plates were inserted to effect the proper connections between such plates and the body sides or bulging fender portions. Frequently the body sides had to be sprung or otherwise distorted to compensate for such irregularities before the plates mentioned could be secured thereto. This, of course, was objectionable and increased the time and expense of manufacturing such vehicles.

In the present construction I have obviated these objectionable features entirely by providing a support that is suspended from the top wall of the hood and that is entirely free of the side walls and fender portions of the body.

In the accompanying drawings:

Figure 1 is a top plan view of a juvenile vehicle embodying my invention;

Figure 2 is a longtudinal sectional view taken substantially on the line 2—2 of Figure 1;

Figure 3 is a cross sectional view taken substantially on the line 3—3 of Figure 2;

Figure 4 is a fragmentary horizontal sectional view taken substantially on the line 4—4 of Figure 2;

Figure 5 is a fragmentary horizontal sectional view taken substantially on the line 5—5 of Figure 2.

Referring now to the drawings, A is the body, B and C, respectively, are the front and rear ground wheels, D is the steering mechanism for the front wheels B, and E is the propelling mechanism for the rear wheels C of an automobile embodying my invention.

The body A is formed from sheet metal and has the laterally spaced side walls 1 and 2 and the transversely extending front and rear walls 3 and 4. Preferably the side walls 1 and 2 are provided adjacent their front and rear ends with outwardly bulging portions 5 and 6 respectively constituting fenders for the front and rear wheels B and C. A hood F is mounted upon the side and front walls 1, 2 and 3, respectively, while a seat H is supported from the side and rear walls 1, 2 and 4, respectively, to complete the automobile body structure.

The front wheels B are mounted on short spindles 7 which have channel-shaped portions 8 mounted to turn about vertical pins 9 within a channel cross member 10 and having rearwardly extending arms 11 pivotally connected to an intermediate tie bar or link 12. In the present instance the channel member 10 is an integral portion of a pressed metal plate J suspended from the top wall 13 of the hood F and is braced by a forwardly extending substantially V-shaped strut or bracket 14 that is secured to the front wall 3 of the body.

As shown, the plate J has a portion 15 that extends vertically from the upper rear edge of the channel 10, a portion 16 that inclines upwardly and rearwardly from the vertical portion 15, and a portion 17 that extends vertically from the upper edge of the inclined portion 16 to the top 13 of the hood. Any suitable means such as the rivets 18 may be used to secure the plate J to the hood F.

At the juncture of the channel 10 and vertical portion 15, and at the juncture of the vertical and inclined portions 15 and 16, as well as at the juncture of the inclined and vertical portions 16 and 17, are embossed gussets 19, 20 and 21 for reinforcing purposes.

Struck rearwardly from the inclined portion 16 of the plate J is a tongue 22 that has an elongated slot 23 for an inclined steering rod or shaft 24. At its upper end above the hood F the steering rod 24 has fixed thereto a suitable hand wheel 25, while at its lower end said rod has an arm 26 projecting substantially at right angles therefrom and terminating in a vertical finger 27 that engages a circular opening 28 in the tie bar 12. Thus, the arm 26 and finger 27 form in effect a crank for actuating the tie bar 12.

For propelling the automobile, I have provided pedal arms 30 that are connected by links 31 to the crank portions 32 of the axle 33 for the rear ground wheels C. Preferably the arms 30 are provided at their upper ends with laterally extending portions 34 that pivotally engage brackets 35 fixed to the vertical portion 17 of the plate J, and are provided at their lower ends with laterally extending portions 36 that pivotally engage the links 31. Pedals 37 of suitable construction are carried by the laterally extending portions 36 upon the outer sides of the links 31. If desired, the links 31 may be provided with a number of openings 38 for receiving the laterally extending portions 36 of the arms 30 so that adjustment may be made to accommodate the legs of children of different sizes.

What I claim as my invention is:

1. In a juvenile vehicle of the type in which a child rides, a body structure having spaced side walls, transversely extending front and rear walls and a hood fixed to said side and front walls, front and rear ground wheels, steering mechanism for the front wheels, propelling mechanism for the rear wheels, and a common support for said steering and propelling mechanisms suspended from said hood free of said side walls and braced from said front wall.

2. In a juvenile vehicle of the type in which a child rides, a body structure having spaced side walls, a transversely extending wall and a hood connected to said side walls, front and rear ground wheels, steering mechanism for the front wheels, propelling mechanism for the rear wheels, and a common support for the steering and propelling mechanisms suspended from said hood free of said side walls and braced from said transversely extending wall.

3. In a juvenile vehicle of the type in which a child rides, a body structure having spaced side walls, a transversely extending wall and a hood connected to said side walls, a pair of ground wheels, steering mechanism for said ground wheels, and a support for said steering mechanism suspended from the hood free of the side walls and braced from the transversely extending wall.

4. In a juvenile vehicle of the type in which a child rides, a body structure having spaced side walls, transversely extending front and rear walls and a hood fixed to said side and front walls, front and rear ground wheels, steering mechanism for the front wheels, propelling mechanism for the rear wheels, and means suspended from said hood free of the side walls and braced from said front wall for supporting said propelling mechanism.

5. In a juvenile vehicle of the type in which a child rides, a body structure having spaced side walls, transversely extending front and rear walls and a hood fixed to said side and front walls, front and rear ground wheels, a plate suspended from said hood between and free of said side walls, a brace connected to said plate and front wall, means carried by said plate for steering said front wheels, and means also carried by said plate for propelling said rear wheels.

6. In a juvenile vehicle of the type in which a child rides, a body structure having spaced side walls, a transversely extending wall and a hood connected to said side walls, a plate suspended from the hood free of the side walls, a brace extending between and rigidly secured to said transversely extending wall and plate at the lower ends thereof, a pair of ground wheels adjacent said plate, and steering mechanism for said ground wheels carried by said plate.

7. In a juvenile vehicle of the type in which a child rides, a body structure having spaced side walls, transversely extending front and rear walls, and a hood fixed to said side and front walls, front and rear ground wheels, a plate suspended from said hood between and free of said side walls, a brace connected to said plate and front wall, a connection between said plate and front ground wheels, and means carried by said plate for propelling said rear ground wheels.

8. In a juvenile vehicle of the type in which a child rides, a body structure having spaced side walls, transversely extending front and rear walls and a hood fixed to said side and front walls, front and rear ground wheels, a plate suspended from the hood free of the side walls and braced from the front wall, a portion of said plate being substantially channel-shaped, spindles for the front wheels mounted to turn in said channel member, a tie bar connected to said spindles, and means carried by said plate for actuating said tie bar.

9. In a juvenile vehicle of the type in which a child rides, a body structure having spaced side walls, transversely extending front and rear walls and a hood fixed to said side and front walls, front and rear ground wheels, a plate suspended from the hood free of the side walls and braced from the front wall, spindles for the front wheels carried by said plate, a tie bar connected to said spindles, and a steering shaft carried by said plate and having a crank portion for actuating said tie bar.

10. A running gear for a juvenile vehicle of the type in which a child rides comprising a plate attachable to a hood of the vehicle, said plate being free of the side walls of the vehicle, ground wheels carried by said plate, and steering mechanism for said wheels carried by said plate.

11. A running gear for a juvenile vehicle of the type in which a child rides comprising a plate attachable to a hood of the vehicle, said plate being free of the side walls of the vehicle, ground wheels in rear of said plate, and propelling mechanism for said ground wheels carried by said plate.

12. A running gear for a juvenile vehicle of the type in which a child rides comprising a plate attachable to a hood of the vehicle, said plate being free of the side walls of the vehicle, ground wheels carried by said plate, ground wheels in rear of said plate, steering mechanism for the first mentioned ground wheels carried by said plate, and propelling mechanism for the last mentioned ground wheels also carried by said plate.

13. In a juvenile vehicle of the type in which a child rides, a body structure having spaced side walls, a transversely extending wall and a hood connected to said side walls, a plate suspended from the hood free of the side walls and braced from the transversely extending wall, a pair of ground wheels adjacent said plate, and steering mechanism for said ground wheels carried by said plate.

14. In a juvenile vehicle of the type in which a child rides, a body structure having spaced side walls, a transversely extending wall and a hood connected to said side walls, a plate suspended from the hood free of the side walls and braced from the transversely extending wall, a pair of ground wheels in rear of said plate, and propelling mechanism for said ground wheels carried by said plate.

SAMUEL A. SNELL.